July 28, 1925.
S. H. COWIN
CONTROL SYSTEM
Filed Nov. 12, 1920
1,547,858
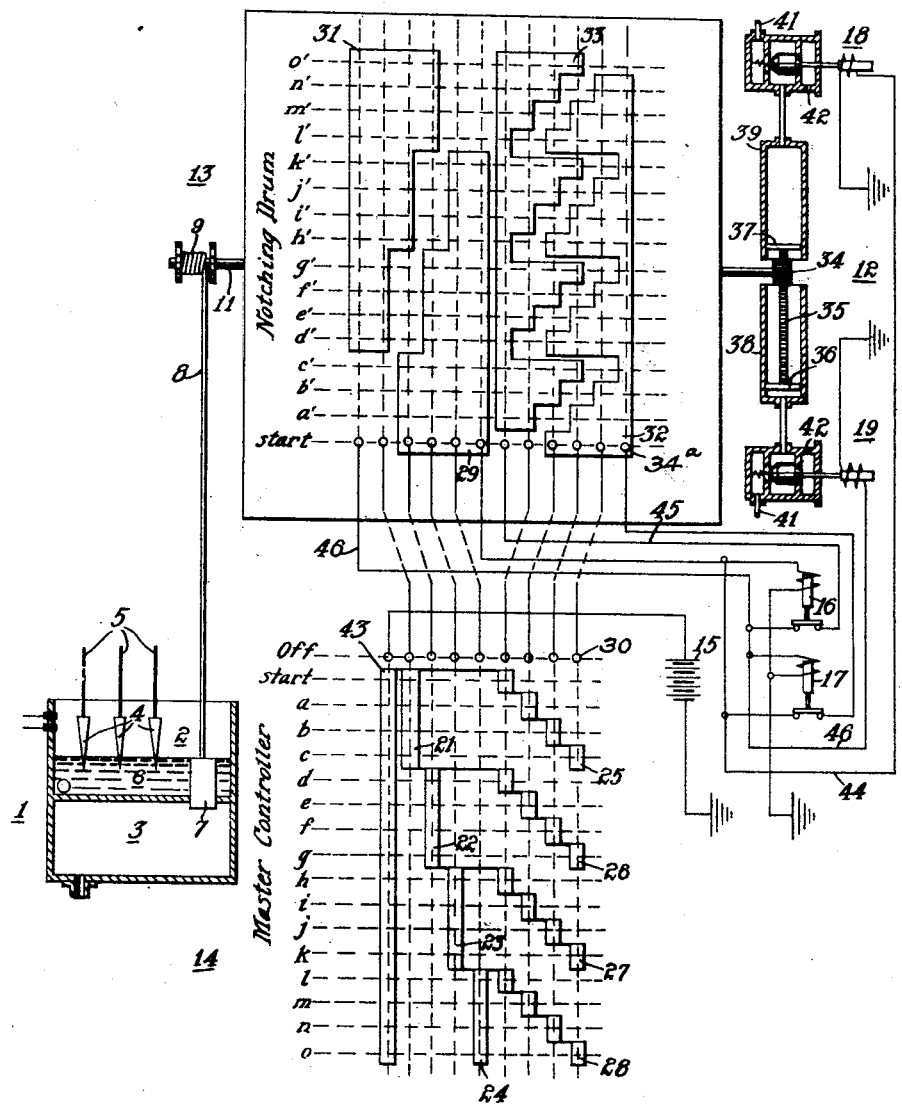
WITNESSES:
INVENTOR
Stuart H. Cowin
BY
ATTORNEY Patented July 28, 1925.

1,547,858

UNITED STATES PATENT OFFICE.

STUART H. COWIN, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed November 12, 1920. Serial No. 423,648.

*To all whom it may concern:*

Be it known that I, STUART H. COWIN, a citizen of the United States, and a resident of Edgewood Park, in the county of Allegheny and State of Pennsylvania, have invented a new and useful Improvement in Control Systems, of which the following is a specification.

My invention relates to control systems and it has particular relation to the operation of liquid rheostats.

The object of my invention is to provide a control system having relatively few conductors between a master controller and an auxiliary controller or notching drum, although ensuring a movement of the latter to a relatively great number of positions which respectively correspond to the positions of the master controller. The auxiliary controller may govern the operation of an electric device, such, for example, as a liquid rheostat.

For a better understanding of my invention, reference should be made to the accompanying drawing the single figure of which is a diagrammatic view of a liquid rheostat that is operated by an auxiliary controller, which is governed by a master controller, in accordance with my invention.

Referring to the drawing, a liquid rheostat 1, comprising an upper or working compartment 2 and a lower or reservoir compartment 3, is provided with a plurality of electrodes 4, which are connected to the secondary winding of a motor (not shown) by conductors 5, in accordance with a familiar practice. The depth of the continuously circulating electrolyte 6 is controlled by a hollow discharge valve 7, in a manner well-known to the art. The valve 7 is raised and lowered by means of a cable 8, which is adapted to be wound upon a drum 9. The drum 9 is mounted upon a shaft 11, which is driven by an electro-pneumatic device 12.

An auxiliary controller 13 is securely mounted upon the shaft 11 and is actuated thereby. The operation of the auxiliary controller 13 is governed by a master controller 14. A source of electrical energy, such as a battery 15, is provided for operating a plurality of relays 16 and 17 and also the actuating coils of governing valves 18 and 19 of the electro-pneumatic device 12.

The master controller 14 has a plurality of primary contact members or segments 21, 22, 23 and 24, and a plurality of secondary, or auxiliary contact segments 25, 26, 27 and 28 that are adapted to engage a plurality of control fingers 30. The master controller 14 also has an "off" position, a "start" position and a plurality of operating positions $a$ to $o$, inclusive.

The auxiliary controller 13 has a "start" position and a plurality of operating positions $a'$ to $o'$, inclusive, which correspond to the "start" and the operating positions of the master controller, respectively.

The auxiliary controller 13 also has a forward primary contact segment 29 and a reverse primary contact segment 31. An auxiliary, or secondary contact segment 32 is provided for forward operation of the notching drum 13 while an auxiliary, or secondary, contact segment 33 is provided for reversing the auxiliary controller 13. The contact segments 29, 31, 32 and 33 are adapted to engage the control fingers 34a of the auxiliary controller 13.

The electro-pneumatic device 12 comprises a pinion 34, which is secured to the shaft 11, a rack member 35, which actuates the pinion 34, and pistons 36 and 37, which are secured at the ends of the rack member 35. The pistons 36 and 37 operate within the cylinders 38 and 39, respectively.

The governing valves 18 and 19 are normally open, thereby permitting air pressure to be applied, through inlet ports 41, to pistons 36 and 37, respectively. When either the actuating coil of the valve 18 or that of the valve 19 is energized, the associated valve closes, thereby removing the pressure from the corresponding piston, as the air within the cylinder escapes through the outlet port 42.

The operation of my invention is begun by actuating the master controller from the "off" position to position $a$, thereby establishing a circuit from the source of electrical energy 15 through contact segments 43 and 25 of master controller 14, contact segment 32 of auxiliary controller 13, the contact members of relay 17, conductor 44, and the actuating coil of valve 18 to ground.

When the actuating coil of the valve 18 is energized, air pressure is removed from the piston 37. The air pressure upon the piston 36 actuated it and the rack member 35. The movement of the rack member 35 rotates the pinion 34 and the shaft 11. The shaft 11 rotates the winding drum 9, causing the discharge valve 7 to rise, thereby increasing the depth of the continuously circulating electrolyte 6 in the compartment 2 of the rheostat 1.

The resistance between the electrodes 4 of the liquid rheostat 1 is decreased by increasing the depth of electrolyte 6 surrounding the electrodes 4, in accordance with familiar principles.

The actuating coil 18 is de-energized as soon as the notching drum 13 has assumed its first position $a'$, as the circuit between the auxiliary contact segment 25 of the master controller and segment 32 of the notching drum 13 is broken.

When the master controller is actuated to a more advanced position, the actuating coil of the electro-pneumatic device 12 remains energized until the auxiliary controller 13 has assumed a position corresponding to the new position of the master controller 14.

For example, if the master controller is actuated to position $m$, a circuit is established from the source of electrical energy 15, through contact segments 43 and 24 of master controller 14, contact segment 29 of auxiliary controller 13, conductor 44 and the actuating coil of valve 18, to ground.

A second circuit would be established intermittently from the auxiliary contact segment 28 of the master controller 14 through auxiliary contact segment 33 of the auxiliary controller 13 and the actuating coil of the valve 19, if it were not that the actuating coil of the relay 16 is energized, thereby breaking the circuit comprising conductors 45 and 46.

As soon as the auxiliary controller 13 reaches position $l'$, the circuit, comprising contact segment 24 of the master controller 14 and contact segment 29 of the auxiliary controller 13, is broken, as the contact segment 29 no longer engages any control finger of the auxiliary controller 13.

However, an electric circuit is established from the supply source of energy 15, through contact segments 43 and 28 of the master controller 14 and secondary contact segment 32 of the auxiliary controller 13, contact members of the relay 17, conductor 44 and actuating coil of the valve 18, to ground. This circuit will not be broken until the auxiliary controller assumes position $m'$.

The auxiliary controller 13 will be operated in a reverse direction, by the electro-pneumatic device 12, whenever the master controller 14 is reversed. For example, if the master controller 14 is actuated to position $f$, a circuit is established from the source of energy 15 through contact segments 43 and 22 of the master controller 14, secondary contact segment 31 of the auxiliary controller 13, conductor 46 and the actuating coil of the valve 19 to ground.

The actuating coil of the valve magnet 19 being energized, fluid pressure is removed from the piston 36.

Fluid pressure upon the piston 37 causes the rack member 35 to operate in a reverse direction, thereby reversing the auxiliary controller 13 and lowering the valve 7 of the liquid rheostat 1. The auxiliary controller 13 will return to position $g'$, as the actuating coil of the valve 19 is energized until the contact segment 31 of the auxiliary controller no longer engages the contact terminal that is electrically energized from the contact segment 22 of the master controller 14.

From position $g'$, the auxiliary controller will be actuated to position $f'$, as a circuit is established from the source of energy 15, through contact segments 43 and 26 of the master controller 14 and secondary contact segment 33 of the auxiliary controller 13, conductor 45, contact members of relay 17, conductor 46 and the actuating coil of valve 19, to ground.

When the auxiliary controller 13 assumes position $f'$, which corresponds to occupied position $f$ of the master controller, the circuit comprising the secondary contact segments 26 and 33 is broken, thereby de-energizing the actuating coil of the valve magnet 19.

It is apparent that the purpose of the relays 16 and 17 is to prevent undesirable circuits through either the secondary contact segments 32 and 33 of the drum 13 from being established while either of conductors 46 and 44 is energized, thereby preventing valves 18 and 19 from operating simultaneously, which would preclude movement of the rack member 35 in the direction desired.

It is apparent from the above description that, by providing both the master controller 14 and the auxiliary controller 13 with a plurality of primary and secondary contact segments, instead of a single contact segment for each controller, the number of wires between the master controller and the auxiliary controller have been greatly reduced. It is, of course, possible to provide an additional number of steps for both the master controller and the auxiliary controller by adding primary or secondary segments to the master controller 14 and also providing additional sections for the primary contact segments 29 and 31 or for the secondary contact segments 32 and 33 of the auxiliary controller 13 in accordance with the design of the master controller 14.

While I have shown my invention in a preferred form, it is apparent that minor modifications may be made in the method of operating the liquid rheostat 1 by the auxiliary controller 13 and that some other means of actuating the shaft 11 may be provided; such, for example, as a reversible pilot motor. It would also be possible to provide a different arrangement of circuits without departing from the spirit of my invention. I desire, therefore, to be limited only by the scope of the appended claims.

I claim as my invention:

1. The combination with a master controller having primary and secondary contact segments, of an auxiliary plural-position controller having primary and secondary contact segments, means comprising an electro-responsive device for actuating said auxiliary controller in either a forward or reverse direction, said device being first governed by a circuit through said primary contact segments and subsequently by a circuit through said secondary contact segments, said circuits being consecutively established and interrupted by the auxiliary controller passing through its different positions, and means for preventing said device from being governed through certain of said auxiliary contact segments during the period when it is governed by said primary contact segments.

2. The combination with a master controller having primary and secondary contact segments, of an auxiliary plural-position controller having primary and secondary contact segments, means comprising an electro-responsive device for actuating said auxiliary controller in either a forward or reverse direction, said device being provided with a winding that is energized first by a circuit through said primary contact segments and subsequently by a circuit through said secondary contact segments, said circuits being consecutively established and interrupted by the auxiliary controller passing through its different positions, and means comprisng a plurality of relays for preventing the winding of said device from being energized through certain of said auxiliary contact segments during the period when it is energized by said primary contact segments.

3. The combination with a plurality of controllers respectively having certain groups of positions, of means comprising a plurality of circuits and a power device connected to one controller and governed by another for actuating the associated controller to a certain position in one group corresponding to a pre-selected position in the corresponding group of said other controller, said circuits being consecutively established and interrupted by said associated controller passing through its different positions and means governed by an established circuit to prevent another circuit being established until said established circuit is interrupted.

In testimony whereof, I have hereunto subscribed my name this 28th day of October 1920.

STUART H. COWIN.